Sept. 23, 1930.    L. S. FRAPPIER ET AL    1,776,383
SPROCKET FOR MOTION PICTURE PROJECTION MACHINES
Original Filed Aug. 31, 1928
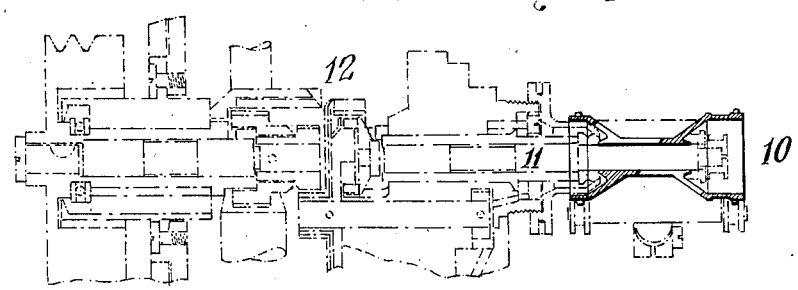
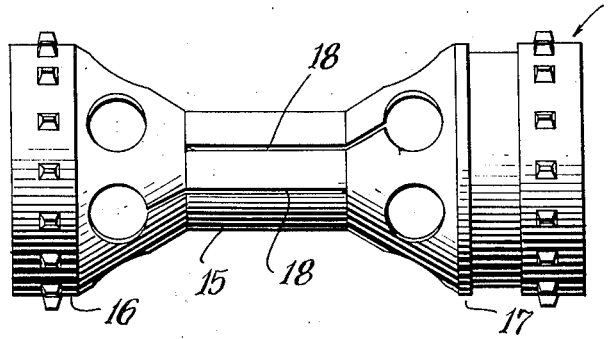
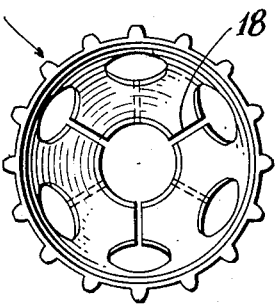
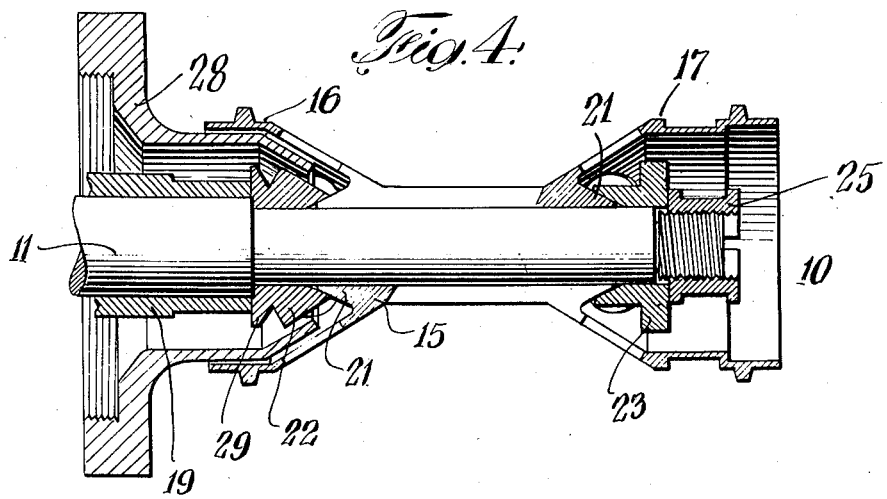
Inventors
Louis S. Frappier
Ewald Boecking
By their Attorney
Howard W. Dix Patented Sept. 23, 1930

1,776,383

UNITED STATES PATENT OFFICE

LOUIS SIMON FRAPPIER AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

SPROCKET FOR MOTION-PICTURE-PROJECTION MACHINES

Original application filed August 31, 1928, Serial No. 303,162. Divided and this application filed October 23, 1928. Serial No. 314,424.

This invention relates to motion picture projection apparatus, and more particularly to a new and improved sprocket and driving means therefor.

This application is a division of our copending application, Serial No. 303,162, filed August 31, 1928, for improvements in projection machine.

An object of the invention is to provide a sprocket of light construction and a simplified mechanism for attaching the same to a driving shaft.

A further object is to prevent oil from being applied to the outer face of the sprocket.

Another object is to provide a readily detachable mounting for a sprocket.

Other objects and advantages will be apparent as the nature of the invention is disclosed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a sectional view of the sprocket showing the relationship thereof to the driving apparatus;

Fig. 2 is an elevation of the sprocket;

Fig. 3 is an end view thereof; and

Fig. 4 is a longitudinal section of the sprocket and driving shaft.

Like reference characters denote like parts in the several figures of the drawings.

In the following description and in the claims parts will be identified by specific names for convenience, but they are intended to be as generic in their application to similar parts as the art will permit.

Referring to the drawings more in detail, sprocket 10 (Fig. 1) is shown as attached to shaft 11 which is driven by intermittent driving mechanism 12, of any well known form. A sprocket of similar construction may, however, be applied to various other portions of the projection apparatus, the above being given by way of example only.

Sprocket 10 comprises a central hub member 15 and flared film engaging end sections 16 and 17. Said hub member and said flared end members may be provided with a plurality of longitudinal slots 18 to furnish the necessary resilience for clamping the sprocket about the shaft in a manner to be described.

The hub member 15 of said sprocket is extended interiorly of the flared end portions to form conical sections 21. Clamping members 22 and 23 are provided with complementary conical surfaces which cooperate with conical sections 21 of said sprocket and exert a wedging action for clamping said sprocket on shaft 11.

Shaft 11 rotates in suitable bearings in stationary sleeve 19. Clamping member 22 bears against the end of said sleeve and determines the longitudinal position of said sprocket on shaft 11. Clamping member 23 is held in firm engagement with the conical hub member of said pulley by nut 25 threaded on the end of shaft 11 into engagement with said clamping member. When said nut is caused to exert pressure on member 23, member 22 is forced against sleeve 19 and conical sections 21 of said sprocket are wedged firmly against shaft 11. Stationary oil guard 28 may be secured to the frame of the machine in any desired manner and is adapted to extend into close proximity to clamping member 22 to prevent oil from coming in contact with the inner surface of the film engaging portion 16 of the sprocket. An oil thread 29 may be formed on member 22 to prevent oil from creeping along the surface of said member toward hub 15 and to discharge said oil into the chamber formed by oil shield 28.

By forming a sprocket in the manner above described a tight construction is obtained while the frictional clamping means permits the sprocket to be rigidly secured to the driving shaft in any desired position. Since the sprocket is held against lateral movement and clamped by the wedging action of the clamping members, the entire assembly may be secured in position by a single nut 25. The oil shield prevents the oil from contacting with the inner face of the sprocket and thence being applied to the film, while oil thread 29 prevents the oil from creeping along the surface of the clamping member and discharges the same outwardly of the sprocket on to the oil shield 28.

A sprocket has been shown herein by way of illustration as applied to the intermittent drive for the film in a motion picture apparatus. It is not to be limited to this use, however, nor is the clamping means limited to sprockets. Various other applications will be apparent to those skilled in the art.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a driving shaft, a rotatable member carried thereby, said member having longitudinal slits to provide resilience, and clamping means for pressing said member into firm engagement with said shaft comprising clamping members positioned interiorly of said rotatable member.

2. In combination with a shaft, a rotatable member comprising a hub portion and flared end portions, said hub portion being extended to form conical surfaces interiorly of said flared portions, said rotatable member having longitudinal slits to provide resilience, members having complementary surfaces cooperating with said conical surfaces, and means for causing the complementary surfaces to produce a wedging action whereby said hub member is firmly pressed against said shaft and frictionally secured thereto.

3. A sprocket for a motion picture machine comprising a hub section and flared film engaging sections, conical extensions in said hub section located interiorly of said flared sections, said sprocket having longitudinal slits spaced thereabout to provide resilience, clamping members having surfaces complementary to said conical surfaces, and means for forcing said members into firm engagement therewith whereby said sprocket may be frictionally secured to said shaft.

LOUIS SIMON FRAPPIER.
EWALD BOECKING.